United States Patent
Zhu et al.

(10) Patent No.: US 12,482,007 B2
(45) Date of Patent: Nov. 25, 2025

(54) RETAIL PRODUCT LISTING ESCALATION EVENT DETECTION

(71) Applicant: Walmart Apollo, LLC, Bentonville, AR (US)

(72) Inventors: Jiazhen Zhu, Fairfax, VA (US); Chenlin Xu, Seattle, WA (US); Rishil J. Cheevelil, Manor, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 610 days.

(21) Appl. No.: 17/589,429

(22) Filed: Jan. 31, 2022

(65) Prior Publication Data
US 2023/0245136 A1    Aug. 3, 2023

(51) Int. Cl.
| | |
|---|---|
| *G06Q 30/018* | (2023.01) |
| *G06F 40/40* | (2020.01) |
| *G06N 5/045* | (2023.01) |
| *G06N 20/20* | (2019.01) |
| *G06Q 30/014* | (2023.01) |
| *G06Q 30/0282* | (2023.01) |

(52) U.S. Cl.
CPC ......... *G06Q 30/0185* (2013.01); *G06F 40/40* (2020.01); *G06N 5/045* (2013.01); *G06N 20/20* (2019.01); *G06Q 30/014* (2013.01); *G06Q 30/0282* (2013.01)

(58) Field of Classification Search
None
See application file for complete search history.

(56) References Cited

U.S. PATENT DOCUMENTS

| | | |
|---|---|---|
| 8,412,557 B1 | 4/2013 | Lloyd |
| 10,410,125 B1 | 9/2019 | Finkelstein |
| 10,621,261 B2 | 4/2020 | Deng |
| 10,922,744 B1 | 2/2021 | Mahajan |
| 11,126,678 B2 | 9/2021 | Chantel |
| 11,205,183 B1 | 12/2021 | Greve |

(Continued)

OTHER PUBLICATIONS

Lee et al., Learning to Pertrub Word Embeddings for Out-of-distribution QA, Proceedings of the 59th Annual Meeting of the Association for Computational Linguistics and the 11th International Joint Conference on Natural Language Processing, pp. 5583-5595 Aug. 1-6, 2021.*

(Continued)

*Primary Examiner* — Richard W. Crandall
(74) *Attorney, Agent, or Firm* — Fitch, Even, Tabin & Flannery LLP

(57) ABSTRACT

The systems and methods provided for automatic retail product listing escalation event detection. The method includes aggregating content items from online resources, determining a topic classification of a content item based on a first machine learning (ML) model, determining an escalation classification of the content item based on a second ML model, generating a keyword list including a plurality of keywords from the content item and scores associated with each of the plurality of keywords based on the topic classification and the escalation classification of the content item, selecting a list of top keywords based on performing a keyword frequency analysis on a plurality of keyword lists associated with the plurality of content items, and providing a detected escalation event.

19 Claims, 9 Drawing Sheets

(56) References Cited

U.S. PATENT DOCUMENTS

| | | | |
|---|---|---|---|
| 11,972,424 | B1* | 4/2024 | Grudetskyi ........ G06Q 30/0601 |
| 2013/0091117 | A1* | 4/2013 | Minh .................... G06F 16/951 |
| | | | 707/709 |
| 2014/0337247 | A1 | 11/2014 | Stephens |
| 2015/0112753 | A1 | 4/2015 | Suvarna |
| 2017/0287023 | A1 | 10/2017 | Koch |
| 2018/0247189 | A1 | 8/2018 | Adel |
| 2019/0073592 | A1 | 3/2019 | Luo |
| 2019/0080207 | A1 | 3/2019 | Chang |
| 2020/0074242 | A1 | 3/2020 | Chen |
| 2020/0097809 | A1 | 3/2020 | Velasco |
| 2020/0125639 | A1 | 4/2020 | Doyle |
| 2020/0184151 | A1* | 6/2020 | Ekmekci ................. G06F 9/542 |
| 2021/0118020 | A1 | 4/2021 | Agarwal |
| 2021/0224843 | A1 | 7/2021 | Dabas |
| 2022/0382795 | A1* | 12/2022 | Sengupta .......... G06F 18/24137 |
| 2023/0245195 | A1 | 8/2023 | Rai |

OTHER PUBLICATIONS

Hayes et al., Journal of Advertising, Can Social Media Listening Platforms' Artificial Intelligence Be Trusted? Examining the Accuracy of Crimson Hexagon's (Now Brandwatch Consumer Research's) AI Driven Analyses, published Sep. 2020.*

Hettiarachchi et al., Embed2Detect: Temporally Clustered Embedded Words for Event Detection in Social Media, https://arxiv.org/pdf/2006.05908, May 25, 2021.*

U.S. Appl. No. 17/588,957, filed Jan. 31, 2022, Jiazhen Zhu.

Amazon Web Services; "What Is Amazon Rekognition?"; https://docs.aws.amazon.com/rekognition/latest/dg/what-is.html; Dec. 4, 2016; 3 pages; retrieved from Internet Archive Wayback Machine https://web.archive.org/web/20161204161247/https://docs.aws.amazon.com/rekognition/latest/dg/what-is.html on May 2, 2022.

Bothra, Deepika; "Escalation Prediction: An Indispensable Part of Modern Customer Support"; https://www.searchunify.com/blog/escalation-prediction-an-indispensable-part-of-modern-customersupport/; Nov. 2, 2020; 5 pages.

Monkey Learn; "Text Analysis, the only guide you'll ever need"; https://monkeylearn.com/text-analysis/; Mar. 14, 2019; 83 pages; retrieved from Internet Archive Wayback Machine https://web.archive.org/web/20190314151618/https://monkeylearn.com/text-analysis/ on May 2, 2022.

Swathi, S., et al.; "Sentiment Analysis of Online Products By Hybrid Feedback Based Recommendation System"; International Journal of Current Research in Life Sciences; Apr. 27, 2018; vol. 07, No. 04; pp. 1918-1922.

Yenala, Harish, et al.; "Deep learning for detecting inappropriate content in text"; Dec. 27, 2017; International Journal of Data Science and Analytics; https://link.springer.com/article/10.1007/s41060-017-0088-4; 14 pages.

Zhu, Jiazhen; "Text Classification: How BERT boost the performance"; https://medium.com/walmartglobaltech/text-classification-how-bert-boost-the-performance-e65d1d678afb; Feb. 18, 2021; 9 pages.

Zhu, Jiazhen;; "Modularization using Python and Docker for Data Pipeline"; https://medium.com/walmartglobaltech/modularization-using-python-and-docker-for-data-pipeline-1193bba7c207; Oct. 26, 2020; 12 pages.

Feldman, R. "Techniques and applications for sentiment analysis." Communications of the ACM. vol. 56, No. 4, p. 82â89. https://doi.org/10.1145/2436256.2436274 (Year: 2013).

Hutto, C. J., et al. "Vader: A Parsimonious Rule-based Model for Sentiment Analysis of Social Media Text." Proceedings of the Eighth International AAAI Conference on Weblogs and Social Media. vol. 8, No. 1. https://doi.org/10.1609/icwsm.v8i1.14550 (Year: 2014).

Medhat, W., et al. "Sentiment analysis algorithms and applications: A survey." Ain Shams Engineering Journal, vol. 5, Iss. 4, pp. 1093-1113, ISSN 2090-4479, https://doi.org/10.1016/j.asej.2014.04.011. (Year: 2014).

Taboada, M., et al. "Lexicon-Based Methods for Sentiment Analysis." Computational Linguistics. vol. 37, Iss. 2, pp. 267â307. doi: https://doi.org/10.1162/COLL_a_00049 (Year: 2011).

USPTO; U.S. Appl. No. 17/588,957; Final Rejection mailed Jul. 31, 2024; (pp. 1-28).

USPTO; U.S. Appl. No. 17/588,957; Non-Final Rejection mailed Mar. 25, 2024; (pp. 1-24).

Li, J., et al. "A Machine Learning Approach for the Detection and Characterization of Illicit Drug Dealers on Instagram: Model Evaluation Study" J Med Internet Res. 21(6):e13803. DOI: 10.2196/13803 (Year: 2019).

Rafea, A., et al., "Topic extraction in social media," 2013 International Conference on Collaboration Technologies and Systems (CTS), San Diego, CA, USA, pp. 94-98, doi: 10.1109/CTS.2013.6567212. (Year: 2013).

USPTO; U.S. Appl. No. 17/588,957; Non-Final Rejection mailed Apr. 23, 2025; (pp. 1-33).

USPTO; U.S. Appl. No. 17/588,957; Notice of Allowance and Fees Due (PTOL-85) mailed Sep. 25, 2025; (pp. 1-12).

\* cited by examiner

410

- It costs money to store extra items that dont sell, not exactly a 'shocked pikachu face' situation.
- Because trading cards are so scary 😱
- Facebook is not internet its boomer/redneck territory
- I don't think so. Think how many loudmouths are on Facebook.
- Probably someone on WallStreetBets 😂
- Only an idiot would fall for this. 🤦
- Hey guys! I got some smiley face stickers that are "Depression approved!" I am now cured! /s
- What is up with target picking on us 😭😭
- I saw somebody with a car sticker saying obsessive cat disorder 😾

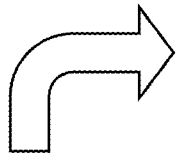

420

- it costs money to store extra items that do not sell not exactly a shocked pikachu face situation
- because trading cards are so scary <grinning face with sweat>
- facebook is not internet its boomer redneck territory
- i do not think so think how many loudmouths are on facebook
- probably someone on wallstreetbets <face with tears of joy>
- only an idiot would fall for this <man facepalming selector>
- hey guys i got some smiley face stickers that are depression approved i am now cured s
- what is up with target picking on us <face with tears of joy><face with tears of joy>
- i saw somebody with a car sticker saying obsessive cat disorder <pouting face>

FIG. 4

```
Layer (type)                    Output Shape        Param #      Connected to
input_ids (InputLayer)          [(None, 128)]       0
input_masks (InputLayer)        [(None, 128)]       0
segment_ids (InputLayer)        [(None, 128)]       0
keras_layer (KerasLayer)        {'pooled_output': (N 29057850    input_ids[0][0]
                                                                 input_masks[0][0]
                                                                 segment_ids[0][0]
global_average_pooling1d (Globa (None, 512)         0            keras_layer[0][1]
dense (Dense)                   (None, 96)          49248        global_average_pooling1d[0][0]
dropout (Dropout)               (None, 96)          0            dense[0][0]
dense_1 (Dense)                 (None, 64)          6208         dropout[0][0]
dropout_1 (Dropout)             (None, 64)          0            dense_1[0][0]
dense_2 (Dense)                 (None, 16)          1040         dropout_1[0][0]
dense_3 (Dense)                 (None, 1)           17           dense_2[0][0]
```

FIG. 5A

| Prediction | Precision | Recall | F1-score | Accuracy | AUC |
|---|---|---|---|---|---|
| Escalation | 87% | 62% | 73% | | |
| Not Escalation | 89% | 97% | 93% | | |
| Overall Performance | 89% | 89% | 88% | 89% | 93% |
| Overall Performance - Retrained | 92% | 92% | 92% | 92% | 96% |

FIG. 5B

| BERT-IMDB | Top-1 | Top-5 | Top-9 | Top-13 |
|---|---|---|---|---|
| Random | 0.988 | 0.971 | 0.955 | 0.946 |
| LIME | 0.955 | 0.945 | 0.938 | 0.938 |
| MUSE | 0.952 | 0.781 | 0.706 | 0.641 |
| MUSE-Lasso | 0.953 | 0.787 | 0.707 | 0.643 |

FIG. 8A

| LSTM-IMDB | Top-1 | Top-5 | Top-9 | Top-13 | LSTM-Reuters | Top-1 | Top-5 | Top-9 | Top-13 |
|---|---|---|---|---|---|---|---|---|---|
| Random | 0.985 | 0.937 | 0.886 | 0.847 | | 0.988 | 0.94 | 0.900 | 0.830 |
| LIME | 0.929 | 0.887 | 0.827 | 0.791 | | 0.984 | 0.927 | 0.879 | 0.810 |
| SHAP | 0.822 | 0.337 | 0.109 | 0.032 | | 0.972 | 0.922 | 0.851 | 0.773 |
| MUSE | 0.826 | 0.354 | 0.185 | 0.125 | | 0.905 | 0.519 | 0.272 | 0.162 |
| MUSE-Lasso | 0.829 | 0.357 | 0.185 | 0.136 | | 0.896 | 0.517 | 0.355 | 0.311 |

FIG. 8B

RETAIL PRODUCT LISTING ESCALATION EVENT DETECTION

TECHNICAL FIELD

This present disclosure relates generally to retail product listing escalation event detection and particularly to automatic escalation event detection based on natural language processing.

BACKGROUND

Online marketplaces are e-commerce sites that can offer a large number of products for sale, which may also include listings from third-party sellers. When a product listing on an online marketplace is perceived as being offensive, non-compliant, and/or counterfeit on social media or the news, the public relations of the marketplace brand can be significantly impacted.

BRIEF DESCRIPTION OF THE DRAWINGS

Disclosed herein are embodiments of apparatuses and methods for providing automatic retail product listing escalation event detection. This description includes drawings, wherein:

FIG. 4 comprises an illustration of preprocessing cleaning of content in accordance with some embodiments;

FIG. 5A and FIG. 5B comprise an example of escalation classification in accordance with some embodiments;

FIG. 8A and FIG. 8B comprise tables of ML explainer engine comparison in accordance with some embodiments.

Figure 1:
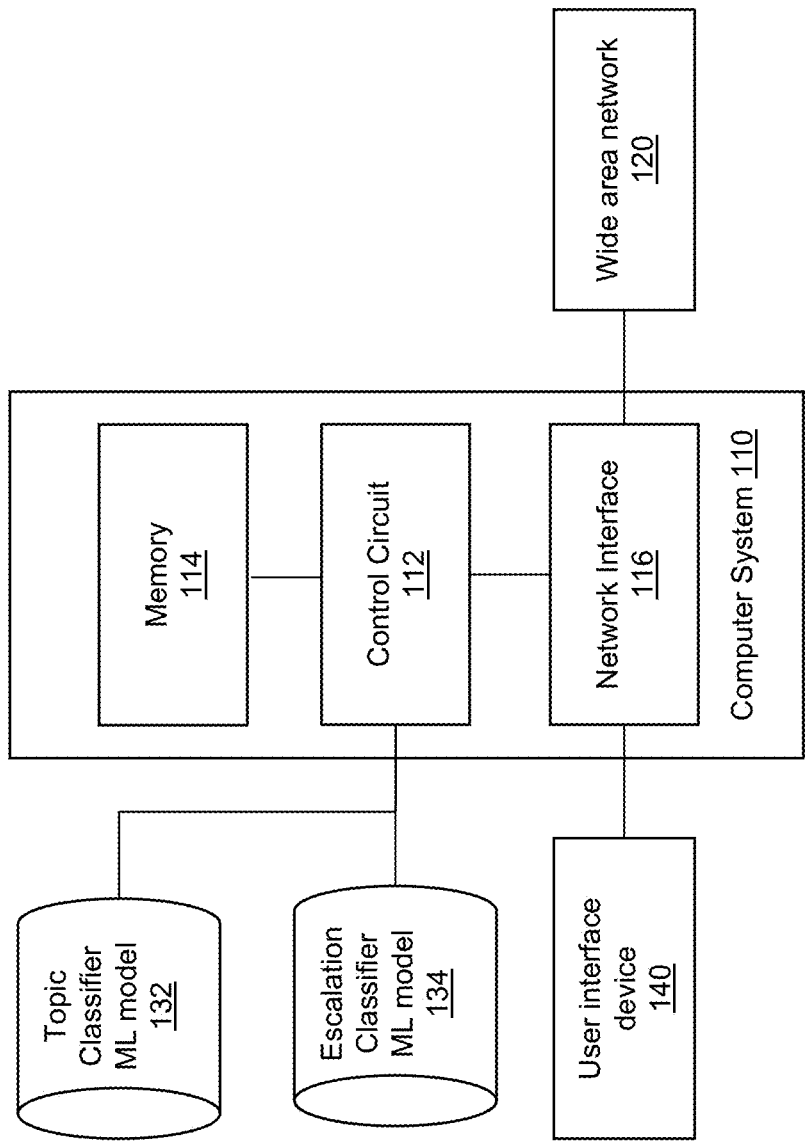
FIG. 1 comprises a block diagram of a system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein for providing retail product listing escalation event detection. A system for retail product listing escalation event detection includes a network interface for accessing a wide-area network, a user interface device, and a control circuit coupled to the network interface and the user interface device. The control circuit being configured to aggregate a plurality of content items from the wide-area network from a plurality of online resources, determine a topic classification of a content item based on a first machine learning (ML) model, determine an escalation classification of the content item based on a second ML model, generate, with an ML explanation engine, a keyword list including a plurality of keywords from the content item and scores associated with each of the plurality of keywords based on the topic classification and the escalation classification of the content item, select, with a keyword analysis module, a list of top keywords based on performing a keyword frequency analysis on a plurality of keyword lists associated with the plurality of content items, and provide for display, via the user interface device, an escalation event detected by the second ML model, a topic associated with the escalation event detected by the first ML model, and one or more keywords associated with the topic determined based on the list of top keywords.

In some embodiments, the systems and methods described herein include a custom-built solution comprising training data annotated by escalation experts, custom-a built ML explanation process, data-centric artificial intelligence (AI), and natural language processing (NLP) models. In some embodiments, the solution has a two-pronged approach—(1) prediction of escalations and problem products and inform about negative trends that may impact new/existing products in the future and (2) a real-time data pipeline, NLP prediction model and alert mechanism to enable timely escalation product sweeps and proactive rule setup for product sweep. In some embodiments, the solution further extracts relevant keywords, uniform resource locator (URL), and image URLs for NLP. As used herein, escalation generally refers to publicly shared content (e.g. social media messages, blog posts, news articles) that is likely to lead to PR concerns for a brand. Product listing escalation generally refers to an escalation that is relevant to one or more products offered for sale. For example, a product listing escalation may relate to politically controversial products, products that became sensitive due to news events, products that violate regulatory compliance (e.g. weapons), products that have been recalled, products that contain misleading information, and products with offensive content (e.g. t-shirt design, mug print, etc.).

Referring now to FIG. 1, a system for product listing escalation detection is shown. The computer system 110 is coupled to a wide-area network 120, a user interface device 140, computer-readable memory storage 114, a topic classifier ML model 132, and an escalation classifier ML model 134.

The computer system 110 comprises a control circuit 112, a memory 114, and a network interface device 116. The computer system 110 may comprise one or more of a server, a central computing system, a cloud-based compute engine, a desktop computer system, a personal computer, a portable device, and the like. The control circuit 112 may comprise a processor, a microprocessor, a central processing unit (CPU), a graphics processing unit (GPU), an application-specific integrated circuit (ASIC), and the like and may be configured to execute computer-readable instructions stored on a computer-readable storage memory 114. The computer-readable storage memory 114 may comprise volatile and/or non-volatile memory and have stored upon it, a set of computer-readable instructions which, when executed by the control circuit 112, causes the computer system 110 to perform ML-based NLP analysis on online content items for retail product listing escalation detection and provide ML output explanations. In some embodiments, the computer-executable instructions may cause the control circuit 112 of the computer system 110 to perform one or more steps and execute one or more modules described with reference to FIGS. 2-3 and 9 herein. In some embodiments, the computer-executable instructions may cause the control circuit 112 of the computer system 110 to provide a user interface (UI), for viewing and interacting with an escalation detection and/or model training processes of the system via a user interface device 140.

The network interface device 116 may comprise a data port, a wired or wireless network adapter, and the like. In some embodiments, the computer system 110 may communicate with the user interface device 140 and the wide-area network 120 over one or more networks such as a local network, a private network, a cloud computing network, or the Internet. The user interface device 140 comprises user input/output devices such as a keyboard, a mouse, a touch screen, a display screen, a virtual reality/augmented reality display device, a speaker, a microphone, etc. In some embodiments, the user interface device 140 may be a processor-based standalone user device such as a personal computer, a desktop computer, a laptop computer, a mobile device, a smartphone, and the like. The user interface device 140 may execute an application for displaying detected product listing escalations provided by the computer system 110. In some embodiments, the user interface device 140 may further be used to provide feedback for retrain the topic classifier ML model 132 and/or the escalation classifier ML model 134. In some embodiments, the user interface device 140 may comprise the input/output user interface of the computer system 110

Figures 6A, 6B:
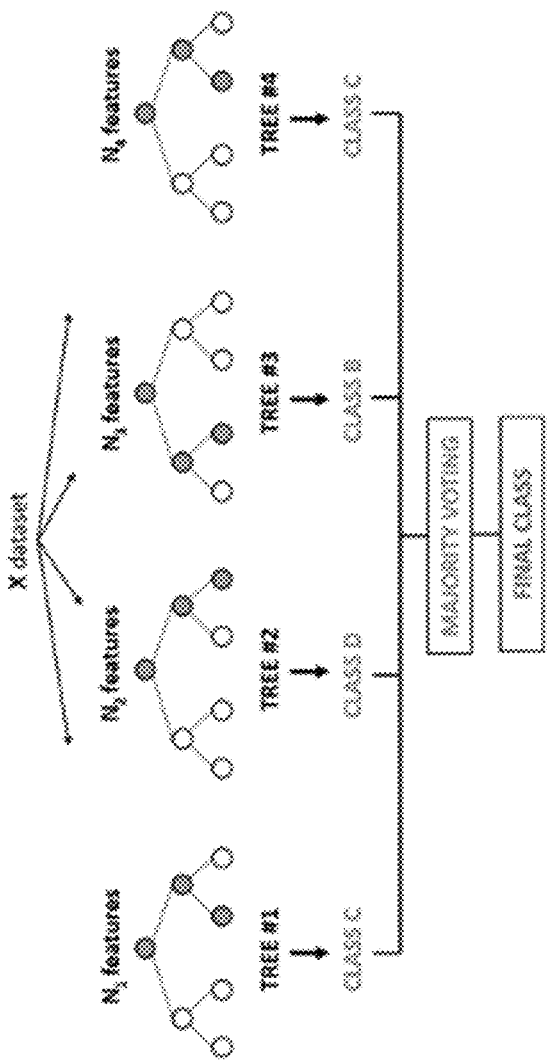
FIG. 6A and FIG. 6B comprise an example of topic classification in accordance with some embodiments.

The topic classifier ML model 132 comprises a first ML model configured to classify content items into one or a number of predefined topics. In some embodiments, the topic classifier ML model 132 comprises a deep learning model for binary classification trained on content items with escalation classification as binary categorization. In some embodiments, topic classifier ML model 132 is configured to take, as input, a content item, such as a text string, and classify the content into one or more of a predefined topic category. In some embodiments, the topic classifier ML model 132 comprises an ML model for multiclass classification that uses term frequency-inverse document frequency (TF-IDF) and random forest classifier. In some embodiments, the topic classifier ML model 132 is periodically retrained based on feedback on the categorization received from a user interface device 140. FIG. 6A comprises an illustration of a random forest classifier. In some embodiments, a random forest classifier selects random samples from the dataset provided, create a decision for each sample selected, predict result from each decision tree, perform voting on the predicted result based on the mode of the classification, and select the most voted prediction result as the final prediction. FIG. 6B is a table showing an example scoring of topic classification evaluation based on an ML model using TF-IDF and random forest classifier. In the example shown, content items are classified into compliance-related, offensive material, intellectual property claim, negative political, product safety, adult content, and graphic content. The precision, recall, and F1-score for each category are shown in the table. The overall performance and retrained overall performance evaluations are also shown.

The escalation classifier ML model 134 comprises a second ML model in the system configured to classify content items as either being associated with potential escalation or not associated with a potential escalation. In some embodiments, the output of the escalation classifier ML model may comprise a numerical value (e.g. percentage) representing the likelihood (e.g. confidence level) that the content item corresponds to an escalation. In some embodiments, the escalation classifier ML model 134 is configured to take, as input, a content item, such as a text string, and classify the content as either escalation or not escalation. In some embodiments, the escalation classifier ML model 134 comprises a deep learning ML model for binary classification that uses a Bidirectional Encoder Representations from Transformers (BERT) model with a classification layer. In some embodiments, the topic classifier ML model 132 is periodically retrained based on feedback on the categorization received from a user interface. FIG. 5A is an example set up for the BERT model with a classification layer. In some embodiments, BERT is a transformer-based ML technique for NLP pre-training. In some embodiments, BERT is pre-trained on two tasks: language modeling (15% of tokens were masked and BERT was trained to predict them from context) and next sentence prediction (BERT is trained to predict if a chosen next sentence was probable or not given the first sentence). As a result of the training process, BERT learns contextual embeddings for words. After pretraining, which is computationally expensive, BERT can be finetuned with less resource on smaller datasets to optimize its performance on specific tasks. FIG. 5B is a table showing an example scoring of escalation classification evaluation based on a BERT pre-trained model with a classification layer. In the example shown, content items are classified as either escalation or not escalation. The precision, recall, and F1-score for each category are shown in the table. The overall performance and retrained overall performance evaluations are also shown.

The wide-area network 120 generally comprises a network of computers that communicates to share data and content. In some embodiments, the wide-area network 120 may comprise the web and/or the Internet on which users publicly share content. In some embodiments, the wide-area network may comprise services and sites for content publishing and sharing such as Twitter, Reddit, BrandWatch, and news sites.

While one computer system 110 is shown, in some embodiments, the functionalities of the computer system 110 may be implemented on a plurality of processor devices communicating on a network such as a cloud-based compute engine. In some embodiments, the computer system 110 may be coupled to a plurality of user interface devices 140 and simultaneously support multiple instances of the user interface application on each user interface device 140 to provide escalation detection.

Figure 2:
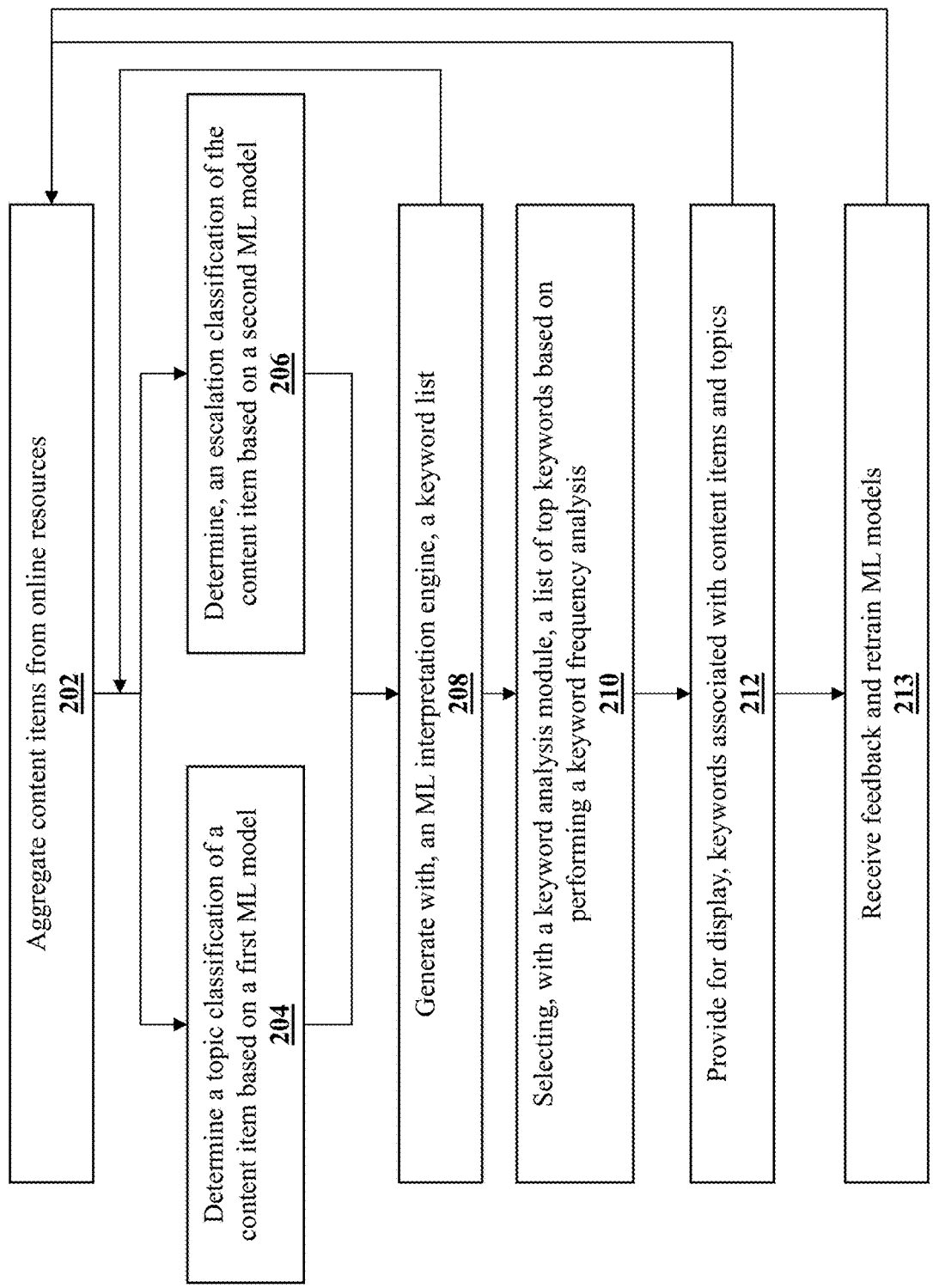
FIG. 2 comprises a flow diagram in accordance with some embodiments.

Referring now to FIG. 2, a method for providing retail product listing escalation event detection is shown. In some embodiments, the steps shown in FIG. 2 may be performed by a processor-based device such as a control circuit executing a set of computer-readable instructions stored on a computer-readable memory. In some embodiments, one or more steps of FIG. 2 may be performed by the computer system 110 described with reference to FIG. 1 herein or a similar device.

In step 210, the system aggregates content items from online resources. In some embodiments, the content items may be aggregated from a wide-area network (e.g. the Internet) from a plurality of online resources (e.g. social media services, news services, websites). In some embodiments, the system may filter available content based on keyword(s), publish date, source, etc., and only aggregate relevant content. For example, the system may aggregate only new content items from the last 24 hours that mention a particular retailer or brand and/or include a link to a particular website such as a retailer e-commerce site.

In some embodiments, after step 202, the aggregated content items go through a preprocessing cleaning process prior to steps 204 and 206. In some embodiments, content data retrieved from the wide-area network via the network interface is processed through stemming and lemmatization to normalize text and remove stop words to generate the content item. In some embodiments, content data retrieved from the wide-area network via the network interface is cleaned by replacing URLs, numbers, and/or emojis with text strings to generate the content item. FIG. 4 includes an illustration of the preprocessing cleaning of content items. In FIG. 4, emojis and punctuations in the retrieve content data 410 are converted to a standardized text string to form the content items 420 to be used as inputs to the ML models.

In step 204, a content item is used as input to the first ML model to perform ML-based topic classification. In some embodiments, the first ML model is a topic classifier ML model configured to take, as input, a content item, such as a text string, and classify the content into one or more of a predefined topic category. In some embodiments, the topic classifier ML model 132 comprises an ML model for multiclass classification that uses term frequency-inverse document frequency (TF-IDF) and random forest classifier.

In step 206, a content item is used as input to a second ML model to perform ML-based escalation classification. In some embodiments, the second ML model is an escalation classifier model configured to classify content items as either being associated with potential escalation or not associated with a potential escalation. In some embodiments, the output of the escalation classifier ML model may comprise a numerical value (e.g. percentage) representing the likelihood (e.g. confidence level) that the content item corresponds to an escalation. In some embodiments, the escalation classifier ML model 134 is configured to take, as input, a content item, such as a text string, and classify the content as either escalation or not escalation. In some embodiments, the escalation classifier ML model 134 comprises a deep learning ML model for binary classification that uses a Bidirectional Encoder Representations from Transformers (BERT) model with a classification layer. In some embodiments, step 206 may be performed first, and only content items are classified as potential escalations (e.g. exceeds a confidence level threshold) are sent to step 204 for topic classification.

In step 208, the system generates a keyword list for the classification of the content item based on an ML explanation engine. In some embodiments, the ML explanation engine uses a normalized linear Gaussian perturbation layer for ML model interpretation. In some embodiments, the ML explanation engine includes an embedded layer between input and the perturbation layer to provide additional context to the ML explanation engine. In some embodiments, the keyword list comprises a plurality of word from the content item and scores associated with each keyword based on the topic categorization and the escalation classification of the content item. In some embodiments, a score for a keyword has a positive value when the keyword is positively associated with a classification output (e.g. escalation or topic), and wherein the score for the keyword has a negative value when the keyword is negatively associated with the classification. In some embodiments, the keyword list generated in step 208 may be displayed in a user interface with a color-code overlay on the text of the content item. For example, words or phrases that have a positive impact on a particular categorization (e.g. escalation vs. not escalation) may have a red color overlay having a shading associated with the score (e.g. deeper red representing more positive score) and words or phrases that have a negative impact on a particular categorization (e.g. escalation vs. not escalation) may have a blue color overlay having a shading associated with the score (e.g. deeper blue representing more negative score).

Figures 7A, 7B:
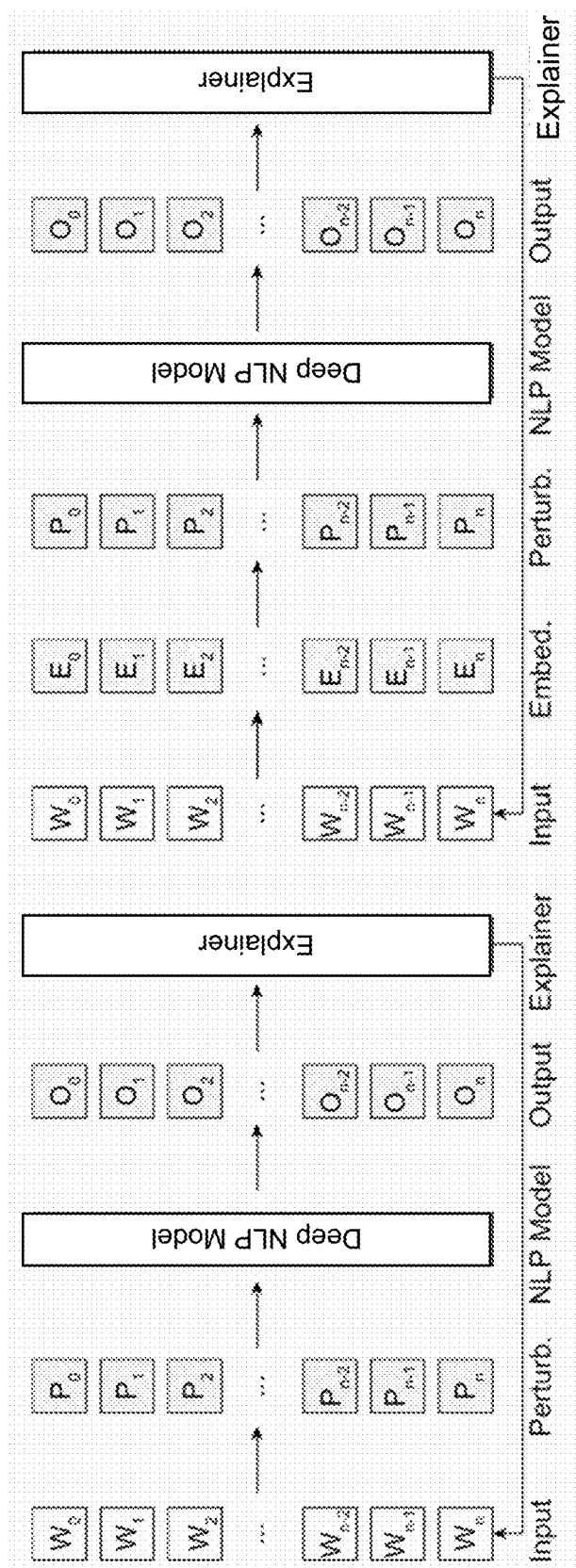
FIG. 7A and FIG. 7B comprise illustrations of machine learning (ML) explainer framework processes in accordance with some embodiments.

FIG. 7A illustrates an ML explanation framework without an embedded layer. The framework includes input being explained, a perturbation layer for perturbating the inputs to multiple data points, the NLP model, the output of the NLP model, and an explainer layer that provides an explanation based on the perturbated outputs. In FIG. 7B, an NLP explainer framework with an embedded layer (referred to as "model-understandable saliency estimation" (MUSE) framework) is added between the input layer and the perturbation layer to provide additional context to the explainer layer. In some embodiments, the embedded layer records representations of discrete entities as vectors of numbers.

In some embodiments, a model-understandable saliency estimation (MUSE) approach uses normalized linear Gaussian perturbations on the encoding layer for model interpretations with a perturbation-based explanation scheme. For both scientific robustness and security reasons, it is important to know to what extent the interpretations can be altered by small systematic perturbations to the input data, which might be generated by adversaries or by measurement biases. Adversarial perturbations that produce perceptively indistinguishable in-puts that are assigned the same predicted label may have very different interpretations. Since the perturbation is based on embedding layers, the importance of both individual words and spatial locations with high contribution to the decision from the hidden layer are considered. In some embodiments, the MUSE coefficient is up to a mean shift parameter, which is the average of the true MUSE coefficientγ. In some cases, the mean shift is insignificant, and MUSE-Lasso yields solutions that have no mean differences with the MUSE coefficient, which is defined as the solution of the empirical version as N→∞. In some embodiments, the algorithm of the MUSE framework is provided as follows:

Algorithm 1: The algorithm description of the proposed framework MUSE.

Input: Model to be interpreted: ModelX, prediction
  results: pred, number of samples: num_sample
Output: Interpretation result for the text data
  specified.
Data: Text data: txet base size: m
Process input data
Create matrix D, U, Σ, $V^h$ = SVD(D)

$$\sum = (V^h)^T (\text{diag}(\sum))^2 V^h + \frac{1}{n} 1_n$$

$D^+ = (V^{h^T} \text{diag}(\Sigma))U^T$
Add noise to Σ
$D^{+'} = D^{+'} \Sigma$
for i ∈ range(num_sample) do
  | Get the prediction from ModelX

| Algorithm 1: The algorithm description of the proposed framework MUSE. |
| --- |
| Calculate perturbations<br>for perturbation ∈ perturbations do<br>   Solve the objective function<br>   obj = argmin \|D * m\|$_1$<br> \|end<br>end |

In some embodiments, the MUSE framework provides a balance between accuracy and speed. In some embodiments, MUSE is tested to be more accurate than Local Interpretable Model-agnostic Explanations (LIME) NLP explainer and faster than the Shapely Additive Explanations (SHAP) NLP explainer in which the Shapely value is the average marginal contribution of a feature value over all possible coalitions. FIGS. 8A and 8B show example accuracy drops of trained long short-term memory (LSTM) and BERT on IMDb and Reuters datasets by masking scheme among different local explanations -LIME, SHAP, MUSE, and MUSE-Lasso NLP explainer engines.

In some embodiments, the keyword list generated in step 208 may be displayed in a user interface with a color-coding overlay on the text of the content item. For example, words or phrases that have a positive impact on a particular categorization (e.g. escalation vs. not escalation) may have a red color overlay having a shading associated with the score (e.g. deeper red representing more positive score) and words or phrases that have a negative impact on a particular categorization (e.g. escalation vs. not escalation) may have a blue color overlay having a shading associated with the score (e.g. deeper blue representing more negative score).

In some embodiments, each topic classification result, escalation class cation result, and ML explanation engine result of a content item may be stored in a database. For example, a content item may be associated with a topic category (e.g. compliance-related, offensive material, etc.), an escalation probability (e.g. 86% likely to be an escalation), a topic classification explanation word list, an escalation classification explanation word list, a content date, and a source domain (e.g. twitter.com, redddit.com). The explanation word list may comprise a list of words each assigned a score (e.g. ('hate', '−0.06008'), ('racist', '−0.05506'); ('provide', '0.04478'), ('taken', '0.03399'), ('need', '0.03267'), ('face', '0.02593')). In some embodiments, steps 204, 206, and 208 may be repeated for any number of content items aggregated in step 202. In some embodiments, the process may be continuously performed as content items are retrieved from online resources. In some embodiments, the content aggregation may be periodic (e.g. every hour, once a day, etc.) and steps 204, 206, and 208 may be repeated for content items aggregated in an aggregation period.

In step 210, top keywords are selected based on performing a keyword frequency analysis on multiple top keyword lists from multiple content items. In some embodiments, in step 210, the system may use CountVectorizer and 3-gram to calculate keyword frequency that is larger than a threshold in a batch of data as a way to reflect popular topics. In some embodiments, in step 210, the system may further perform duplication removal that removes identical or similar content items (e.g. retweets) prior to identifying popular topics. In some embodiments, the duplication removal may instead be performed prior to steps 204 and 206.

In step 212, the system provides for display, keywords associated with content items and/or topics. In some embodiments, aggregated keyword frequencies from a plurality of content items are displayed with identified popular topics. In some embodiments, individual content items may be displayed with escalation classification, topic classification, and keywords from the content item.

In some embodiments, after step 212, the system is further configured to identify at least one product based on the list of top keywords and product characteristics stored in a product database and generate an alert for removal of at least one product via the user interface device. In some embodiments, for an escalation that is identified with a confidence level exceeding a threshold, the system may be configured to automatically remove/hide an identified product from the e-commerce site without human intervention. In some embodiments, the automatic removal may be temporary, pending a human reviewer's approval for long-term/permanent removal.

In step 213, the system receives feedback on the content item topic and escalation classifications and retrains the topic classification model and the escalation classification model. In some embodiments, the system may provide, via the user interface device, an escalation review interface, wherein feedback received from the escalation review interface is used to further train at least one of the ML models.

In some embodiments, steps 202 to 212 may be repeated periodically (every hour, once a day, etc.) and an escalation event detection report may be provided with each run. In some embodiments, step 213 may be performed periodically (e.g. daily, weekly), and the ML models may be retrained and used in subsequent topic classification and escalation classification on later-retrieved content items.

Figure 3:
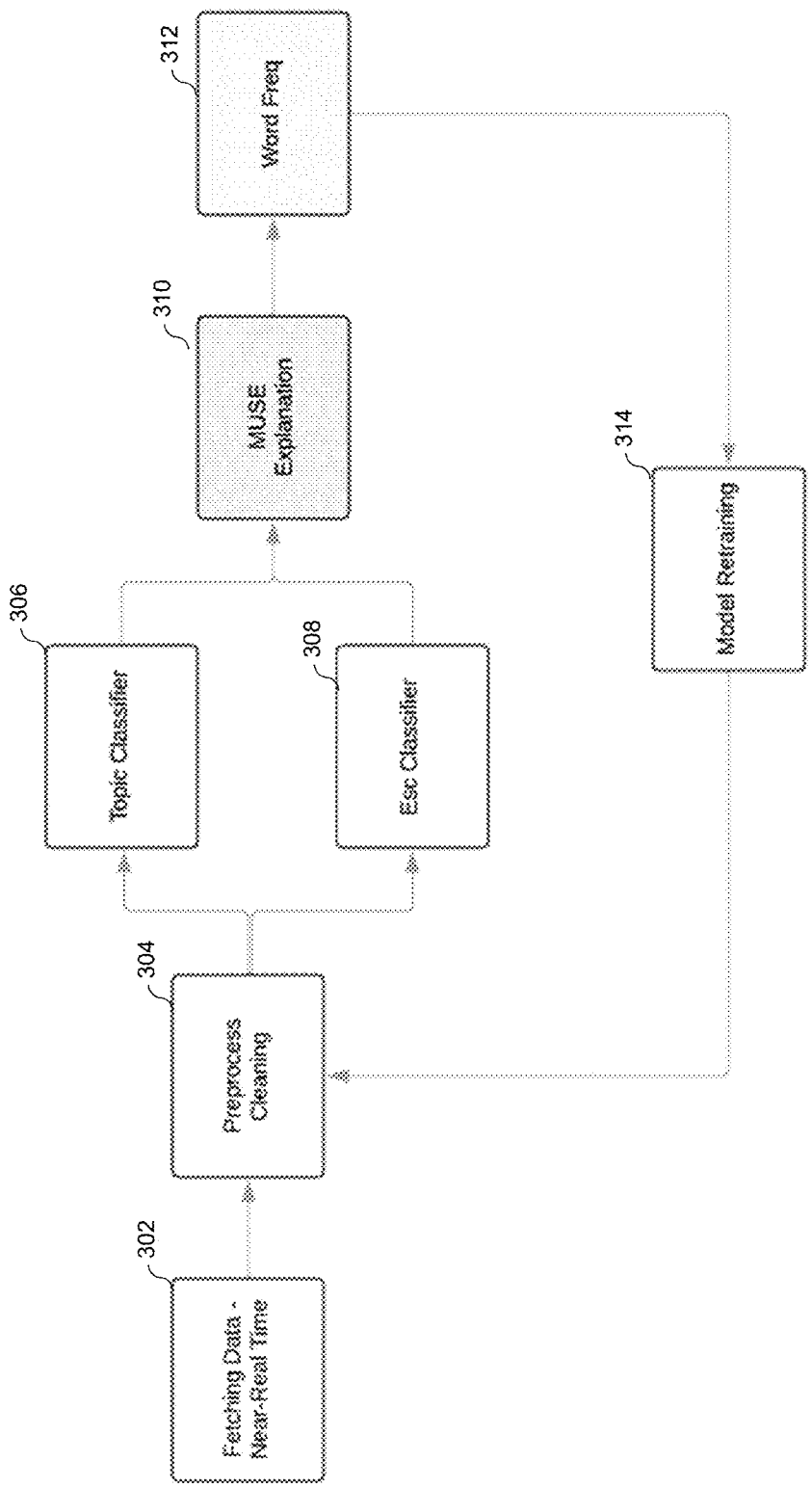
FIG. 3 comprises a flow diagram in accordance with some embodiments.

Referring now to FIG. 3, a method for providing retail product listing escalation event detection is shown. In some embodiments, the steps shown in FIG. 3 may be performed by a processor-based device such as a control circuit executing a set of computer-readable instructions stored on a computer-readable memory. In some embodiments, one or more steps of FIG. 3 may be performed by the computer system 110 described with reference to FIG. 1 herein or a similar device.

In step 302, data from online sources (e.g. social media services, website, new services) are fetched in near real-time). In some embodiments, the system may filter available content based on keyword(s), publish date, source, etc., and only aggregate relevant content.

In step 304, the system performs preprocess cleaning on the fetched data. In some embodiments, preprocess cleaning comprises stemming and lemmatization to normalize text and remove stop words to generate the content item. In some embodiments, content data retrieved from the wide-area network via the network interface is cleaned by replacing URLs, numbers, and/or emojis with text strings to generate the content item. In some embodiments, duplicated content items are removed. Step In step 306, the content item is classified by a topic classifier. In some embodiments, the first ML model is a topic classifier ML model configured to take, as input, a content item, such as a text string, and classify the content into one or more of a predefined topic category. In some embodiments, the topic classifier ML model comprises an ML model for multiclass classification that uses term frequency-inverse document frequency (TF-IDF) and random forest classifier.

In step 308, the content item is classified by an escalation classifier. In some embodiments, the escalation classifier ML model comprises a deep learning ML model for binary classification that uses a Bidirectional Encoder Representations from Transformers (BERT) model with a classification layer.

In step 310, an NLP explanation engine (e.g. MUSE) processes the results from steps 306 and 308 to provide an explanation of the ML model outputs. In some embodiments, the ML explanation engine uses a normalized linear Gaussian perturbation layer for ML model interpretation. In some embodiments, the ML explanation engine includes an embedded layer between input and the normalized linear Gaussian perturbation layer to provide additional context to the ML explanation engine. In some embodiments, the keyword list comprises a plurality of keywords from the content item and scores associated with each of the plurality of keywords based on the topic categorization and the escalation classification of the content item.

In step 312, word frequency analysis is performed on keyword lists from multiple content items. In step 314, the output of steps 306, 308, 310, and 312 are provided to a reviewer for feedback. The received feedback may be used to retrain the topic classifier ML model and the escalation classifier model. The retrained models are then used in the subsequent NLP classification of content items.

Figure 9:
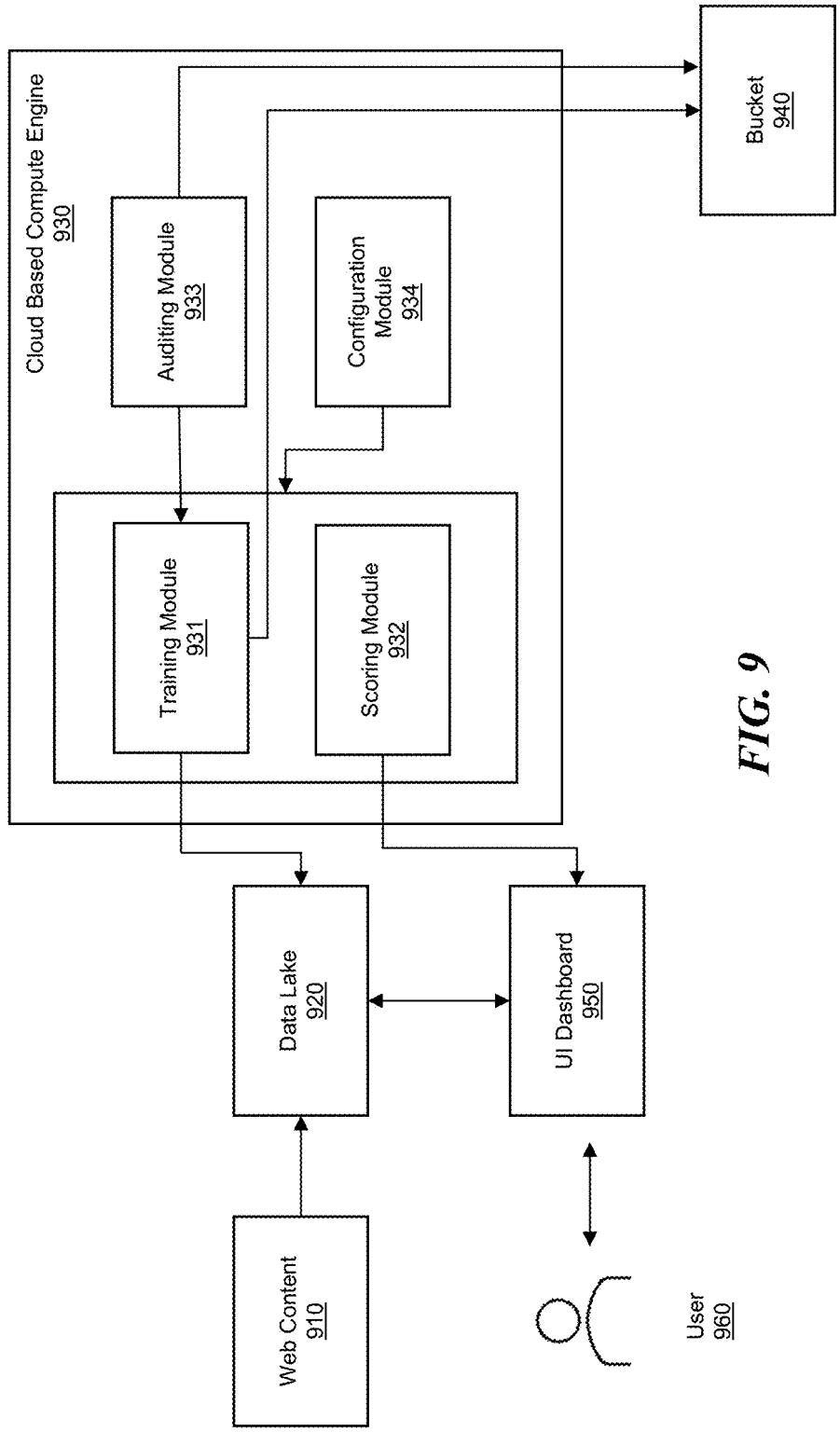
FIG. 9 comprises a block diagram in accordance with some embodiments.

Referring now to FIG. 9, a block diagram for product listing escalation detection software architecture is shown. A cloud-based compute engine 930 includes a training module for ML model training, a scoring module 932 for keyword scoring, an auditing module 933 for auditing ML results, and a configuration module 934 for configuring ML modules. Data used by the training module 931 and the auditing module 933 may be stored and retrieved from a data bucket 940.

The training module retrieve data from a data lake 920 that store data retrieved from web content 910. A UI dashboard 950 is provided to use the information from the data lake 920 and the scoring module 932 to provide escalation detection information to a user 960. In some embodiments, the cloud-based compute engine 930 may access other networked data or services resources (e.g. software object repository, programming packages, container library, etc.) for use by one or more of its modules.

In some embodiments, a system for retail product listing escalation event detection includes a network interface for accessing a wide-area network, a user interface device, and a control circuit coupled to the network interface and the user interface device. The control circuit being configured to aggregate a plurality of content items from the wide-area network from a plurality of online resources, determine a topic classification of a content item based on a first machine learning (ML) model, determine an escalation classification of the content item based on a second ML model, generate, with an ML explanation engine, a keyword list including a plurality of keywords from the content item and scores associated with each of the plurality of keywords based on the topic classification and the escalation classification of the content item, select, with a keyword analysis module, a list of top keywords based on performing a keyword frequency analysis on a plurality of keyword lists associated with the plurality of content items, and provide for display, via the user interface device, an escalation event detected by the second ML model, a topic associated with the escalation event detected by the first ML model, and one or more keywords associated with the topic determined based on the list of top keywords.

In some embodiments, a method retail product listing escalation event detection includes aggregating, via network interface for accessing the wide-area network, a plurality of content items from a plurality of online resources, determining, with a control circuit, a topic classification of a content item based on a first machine learning (ML) model, determining, with the control circuit, an escalation classification of the content item based on a second ML model, generating, with an ML explanation engine executed on the control circuit, a keyword list including a plurality of keywords from the content item and scores associated with each of the plurality of keywords based on the topic classification and the escalation classification of the content item, selecting, with a keyword analysis module executed on the control circuit, a list of top keywords based on performing a keyword frequency analysis on a plurality of keyword lists associated with the plurality of content items, and providing for display, via an user interface device, an escalation event detected by the second ML model, a topic associated with the escalation event detected by the first ML model, and one or more keywords associated with the topic determined based on the list of top keywords.

In some embodiments, a method for machine learning (ML) interpretation includes receiving, at a control circuit, an input text string and a categorization from an ML model, executing, at the control circuit, an ML explanation engine including a layer, an embedded layer between input and the normalized linear Gaussian perturbation layer to provide additional context to the ML explanation engine, and an explainer layer, and generating, via the ML explanation engine, a keyword list including a plurality of keywords from the input text string and scores associated with each of the plurality of keywords indicating a significance of each of the plurality of keywords to the categorization outputted by the ML model.

Those skilled in the art will recognize that a wide variety of other modifications, alterations, and combinations can also be made with respect to the above-described embodiments without departing from the scope of the present disclosure and that such modifications, alterations, and combinations are to be viewed as being within the ambit of the inventive concept.

What is claimed is:

1. A system for retail product listing escalation event detection, the system comprises:
   a network interface for accessing a wide-area network;
   a user interface device; and
   a control circuit coupled to the network interface and the user interface device, the control circuit executes computer-readable instructions to:
      aggregate a plurality of content items from the wide-area network from a plurality of online resources, including social media services, wherein the plurality of content items comprises social media content;
      determine a topic classification of a content item based on a first machine learning (ML) model;
      determine an escalation classification of the content item based on a second ML model;
      generate, with an ML explanation engine, a keyword list comprising a plurality of keywords from the content item and scores associated with each of the plurality of keywords based on the topic classification from the first ML model and the escalation classification from the second ML model;
      select, with a keyword analysis module, a list of top keywords based on performing a keyword frequency analysis on a plurality of keyword lists associated with the plurality of content items, including a plurality of social media content items; and provide for display, via the user interface device, an escalation event detected by the second ML model, a topic associated with the escalation event detected by the first ML model, and one or more keywords associated with the topic determined based on the list of top keywords;

wherein the ML explanation engine uses a perturbation layer that provides perturbation as input to at least one of the first ML model and the second ML model based on an embedded layer, and wherein the keyword list is determined based on model outputs from the perturbations generated by the perturbation layer.

2. The system of claim 1, wherein content data retrieved from the wide-area network via the network interface is processed through stemming and lemmatization to normalize text and remove stop words to generate the content item.

3. The system of claim 1, wherein content data retrieved from the wide-area network via the network interface is cleaned by replacing uniform resource locators (URLs), numbers, and/or emojis with text strings to generate the content item.

4. The system of claim 1, wherein the first ML model comprises an ML model for multiclass classification trained on content items with topics as categorization.

5. The system of claim 1, wherein the second ML model comprises a deep learning model for binary classification trained on content items with escalation classification as binary categorization.

6. The system of claim 1, wherein the ML explanation engine uses a normalized linear Gaussian perturbation layer for ML model interpretation.

7. The system of claim 6, wherein the ML explanation engine includes an embedded layer between input and the normalized linear Gaussian perturbation layer to provide additional context to the ML explanation engine.

8. The system of claim 6, wherein a score for a keyword has a positive value when the keyword is positively associated with escalation, and wherein the score for the keyword has a negative value when the keyword is negatively associated with escalation.

9. The system of claim 1, wherein the control circuit is further configured to:

provide, via the user interface device, an escalation review interface, wherein feedback received from the escalation review interface is used to further train the first ML model and/or the second ML model.

10. The system of claim 1, wherein the control circuit is further configured to:

identify at least one product based on the list of top keywords and product characteristics stored in a product database; and generate an alert for removal of the at least one product via the user interface device.

11. A method for retail product listing escalation event detection, the method comprises:

aggregating, via network interface for accessing a wide-area network, a plurality of content items from a plurality of online resources including social media services, wherein the plurality of content items comprises social media content;

determining, with a control circuit, a topic classification of a content item based on a first machine learning (ML) model;

determining, with the control circuit, an escalation classification of the content item based on a second ML model;

generating, with an ML explanation engine executed on the control circuit, a keyword list comprising a plurality of keywords from the content item and scores associated with each of the plurality of keywords based on the topic classification from the first ML model and the escalation classification from the second ML model;

selecting, with a keyword analysis module executed on the control circuit, a list of top keywords based on performing a keyword frequency analysis on a plurality of keyword lists associated with the plurality of content items, including a plurality of social media content items; and providing for display, via an user interface device, an escalation event detected by the second ML model, a topic associated with the escalation event detected by the first ML model, and one or more keywords associated with the topic determined based on the list of top keywords;

wherein the ML explanation engine uses a perturbation layer that provides perturbation as input to at least one of the first ML model and the second ML model based on an embedded layer, and wherein the keyword list is determined based on model outputs from the perturbations generated by the perturbation layer.

12. The method of claim 11, wherein content data retrieved from the wide-area network via the network interface is processed through stemming and lemmatization to normalize text and remove stop words to generate the content item.

13. The method of claim 11, wherein content data retrieved from the wide-area network via the network interface is cleaned by replacing URLs, numbers, and/or emojis with text strings to generate the content item.

14. The method of claim 11, wherein the first ML model comprises an ML model for multiclass classification trained on content items using topics as categorization.

15. The method of claim 11, wherein the second ML model comprises a deep learning model for binary classification trained on content items using escalation classification as binary categorization.

16. The method of claim 11, wherein the ML explanation engine uses a normalized linear Gaussian perturbation layer for ML model interpretation.

17. The method of claim 16, wherein the ML explanation engine includes an embedded layer between input and a perturbation layer to provide additional context to the ML explanation engine.

18. The method of claim 16, wherein a score for a keyword has a positive value when the keyword is positively associated with escalation, and wherein the score for the keyword has a negative value when the keyword is negatively associated with escalation.

19. The method of claim 11, further comprising:

providing, via the user interface device, an escalation review interface, wherein feedback received from the escalation review interface is used to further train the first ML model and/or the second ML model.

* * * * *